(12) United States Patent
Takeuchi

(10) Patent No.: US 8,984,497 B2
(45) Date of Patent: Mar. 17, 2015

(54) SOURCE CODE CONVERTING, METHOD PROGRAM, AND SYSTEMS FOR FIRST PROGRAMMING LANGUAGE TO A CODE IN A SECOND PROGRAMMING LANGUAGE

(71) Applicant: International Business Machines Corporation, Armonk, NY (US)

(72) Inventor: Mikio Takeuchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/718,325

(22) Filed: Dec. 18, 2012

(65) Prior Publication Data

US 2013/0174131 A1    Jul. 4, 2013

(30) Foreign Application Priority Data

Jan. 4, 2012 (JP) ................................. 2012-000030

(51) Int. Cl.
G06F 9/45  (2006.01)

(52) U.S. Cl.
CPC ........................................ G06F 8/51 (2013.01)
USPC ............................ 717/137; 717/139; 717/140

(58) Field of Classification Search
USPC .................................................. 717/136–141
IPC ........................................ G06F 8/30,8/40, 8/51
See application file for complete search history.

(56) References Cited

U.S. PATENT DOCUMENTS

| | | | |
|---|---|---|---|
| 4,374,408 A * | 2/1983 | Bowles et al. ................. | 717/137 |
| 5,920,720 A * | 7/1999 | Toutonghi et al. ............ | 717/148 |
| 6,195,792 B1 * | 2/2001 | Turnbull et al. .............. | 717/110 |
| 6,654,950 B1 * | 11/2003 | Barnishan ..................... | 717/136 |
| 6,662,359 B1 * | 12/2003 | Berry et al. ................... | 717/130 |
| 6,721,941 B1 * | 4/2004 | Morshed et al. .............. | 717/127 |
| 6,901,584 B2 * | 5/2005 | Shann .......................... | 717/140 |
| 7,406,682 B2 * | 7/2008 | Todd et al. .................... | 717/137 |
| 7,797,579 B2 * | 9/2010 | Dickerson et al. ............. | 714/35 |
| 7,992,140 B2 * | 8/2011 | Meijer et al. .................. | 717/140 |
| 8,001,535 B2 * | 8/2011 | Brown ......................... | 717/138 |
| 8,065,668 B2 * | 11/2011 | Bosworth et al. ............. | 717/141 |
| 8,458,678 B2 * | 6/2013 | Meijer et al. .................. | 717/140 |
| 8,527,946 B2 * | 9/2013 | Vaziri-Farahani et al. ... | 717/116 |

(Continued)

OTHER PUBLICATIONS

Wu et al, "Efficient SIMD Code Generation for Runtime Alignment and Length Conversion" IEEE, 1-12, 2005.*

(Continued)

*Primary Examiner* — Anil Khatri

(74) *Attorney, Agent, or Firm* — Scully, Scott, Murphy & Presser, P.C.; Gail H. Zarick, Esq.

(57) ABSTRACT

A system, method and computer program product to provide a technique for achieving high speed and stable dispatch of a code in a programming language based on erasure, the code being converted from a code written in a programming language based on reification. The system, method and computer program product perform a function of adding a synthetic class having the same name as a suffix for name mangling of a normal method in a first programming language based on reification, adding a dummy parameter of the type of the synthetic class to a constructor definition, and adding an appropriate value (normally, null) that matches the type of the dummy parameter to a constructor invocation to convert the code in the first programming language to a code in a second programming language based on erasure.

12 Claims, 3 Drawing Sheets

(56) References Cited

U.S. PATENT DOCUMENTS 8,645,932 B2* 2/2014 Wright et al. ............... 717/146
8,726,247 B2* 5/2014 Wilkinson et al. ............ 717/139

OTHER PUBLICATIONS

Hoschka, "Compact and Efficient Presentation Conversion Code", IEEE/ACM Transactions on Networking, vol. 6, No. 4, pp. 389-396, 1998.*

Menard et al, "Automatic Floating-point to Fixed-point Conversion for DSP Code Generation", ACM, pp. 270-276, 2002.*

Pflughoeft et al, "Multi-Layered Activity Cycle Diagrams and Their Conversion Into Activity-Based Simulation Code", ACM, pp. 595-599, 1994.*

English language Abstract of JP09-190349A, Jul. 2, 1997.

English language Abstract of JP2000-250755a, Sep. 14, 2000.

"X10: Performance and Productivity at Scale", http://x10-lang.org, last printed Oct. 12, 2012, pp. 1-2.

"IBM WebSphere eXtreme Scale Version 7.1.1, Programming Guide" ftp://public.dhe.ibm.com/software/webserver/appserv/library/v71/711_prog_pdf.pdf, Feb. 6, 2012.

* cited by examiner

SOURCE CODE CONVERTING, METHOD PROGRAM, AND SYSTEMS FOR FIRST PROGRAMMING LANGUAGE TO A CODE IN A SECOND PROGRAMMING LANGUAGE

TECHNICAL FIELD

The present invention relates to a technique for converting a code written in one programming language to a code in another programming language, and more specifically, it relates to speeding up and stabilizing dispatch of the converted code, that is, execution by an operating system.

BACKGROUND ART

In programming languages, implementation of generics is based on reification or erasure. Reification is a technique of compiling generics to a type specialized to the values of type parameters. Typical languages that adopt it are C++ and X10. For the characteristics and language specifications of X10.

Erasure is a technique of compiling generics to a common type in which type parameters are removed. Typical languages that adopt it are Java® and Scala. With erasure, since type parameters are removed after being checked during compiling, the values of the type parameters cannot be referred to at run-time. Accordingly, functions that depend on the values of type parameters at run-time (run-time type information), such as dispatch, cannot be implemented, so that the feature of erasure-based generics is a subset of the feature of reification-based one. Accordingly, conversion of a language that adopts generics based on reification to Java® generics based on erasure requires expressing run-time type information in one form or another.

For dispatch, a name mangling technique of encoding type information to a method name is used for a normal method. Since this technique can use Java® dispatch, high-speed dispatch is possible. Furthermore, the result of conversion depends only on the type of the parameters of the conversion target method, thus allowing stable conversion independent of other changes.

For constructors, a parameter mangling technique of encoding type information to the parameters of constructors is used because the names of constructors cannot be freely changed.

Compiling X10 source code to Java® source code or bytecode has been performed in the related art. In the related art, the order of implementation (0th, 1st, . . . ) of the conversion target constructor among constructors in the same class is encoded to the dimension of a multidimensional array of the type that does not generally appear in the parameters of constructors in X10, and a dummy parameter of the type is added. This enables high-speed dispatch because Java® dispatch can be used. However, this is based on a relative value, that is, the order of implementation of the constructor, thus causing instability of the conversion result being changed due to addition or deletion of another constructor in the same class. This causes problems when a complied library is provided in a binary form or when external (non-X10) Java code for calling Java® code generated by an X10 compiler is described.

For processing class constructors, the following related art is known.

Japanese Unexamined Patent Application Publication No. 9-190349 discloses a method for increasing a program execution speed by determining a class in which a source program described in C++ can be optimized, translating the member functions of the class to an intermediate expression, thereafter generating a code generating routine described in C++, embedding the generated code generating routine in constructors, and determining whether optimization of all classes has been finished and, if it is determined that it has been finished, completing the process.

Japanese Unexamined Patent Application Publication No. 2000-250755 discloses a method comprising the steps of detecting a keyword for identifying an adaptive class by analyzing an application source file, wherein if the adaptive class includes an adaptive software method, and when generating a first instance of the adaptive class, expanding constructors in the adaptive class by inserting a first instruction set for generating a selector that dynamically selects one of a large number of implementations of the adaptive software method to the application source file.

However, such related art does not solve the instability of dispatch when a code written in a programming language based on reification is converted to a code in a programming language based on erasure.

WebSphere® extreme Scale adopts a parameter mangling technique of adding dummy parameters of the same number as the order of definition of the constructor (continuous integers starting from 0). However, this technique has a problem in that stable dispatch is impossible because the order of definition of the constructor is a relative value and can be changed due to the order of addition of another constructor. Furthermore, using a plurality of dummy parameters wastes stacks, thus reducing efficiency.

Furthermore, the existing X10 adopts a parameter mangling technique of adding a dummy parameter of a multidimensional array in the same dimension as the order of definition of the constructor (continuous integers starting from 0). In this case, there is also a problem in that stable dispatch is impossible because the order of definition of the constructor is a relative value and can be changed due to addition or deletion of another constructor.

Another existing method for X10 is a method of self dispatch based on the values of parameters, that is, run-time type information, in which case JVM dispatch cannot be used, thus causing a delay of dispatch.

CITATION LIST

Patent Literatures

[Patent Literature 1] Japanese Unexamined Patent Application Publication No. 9-190349
[Patent Literature 2] Japanese Unexamined Patent Application Publication No. 2000-250755

Non-Patent Literature

SUMMARY OF INVENTION

Technical Problem

Accordingly, it is an object of the present invention to provide a technique for achieving high speed and stable dispatch of a code in a programming language based on erasure, the code being converted from a code written in a programming language based on reification.

Solution to Problem

The present invention is conceived to solve the above problem and is achieved by a program having the function of adding a synthetic class having the same name as a suffix for name mangling of a normal method in a first programming language based on reification, adding a dummy parameter of the type of the synthetic class to a constructor definition, and adding an appropriate value (normally, null) that matches the type of the dummy parameter to a constructor invocation to convert the code in the first programming language to a code in a second programming language based on erasure.

The first programming language based on reification is preferably X10, and the second programming language based on erasure is preferably Java®.

Advantageous Effects of Invention

According to the present invention, by encoding run-time type information to the type of a dummy parameter, a high-speed dispatch mechanism of a language processing system based on erasure, such as Java®, can be advantageously used.

Furthermore, a synthetic class having the same name as a suffix for name mangling allows mangling of individual methods irrespective of another method, thus allowing stable dispatch.

DESCRIPTION OF EMBODIMENTS

Figure 1:
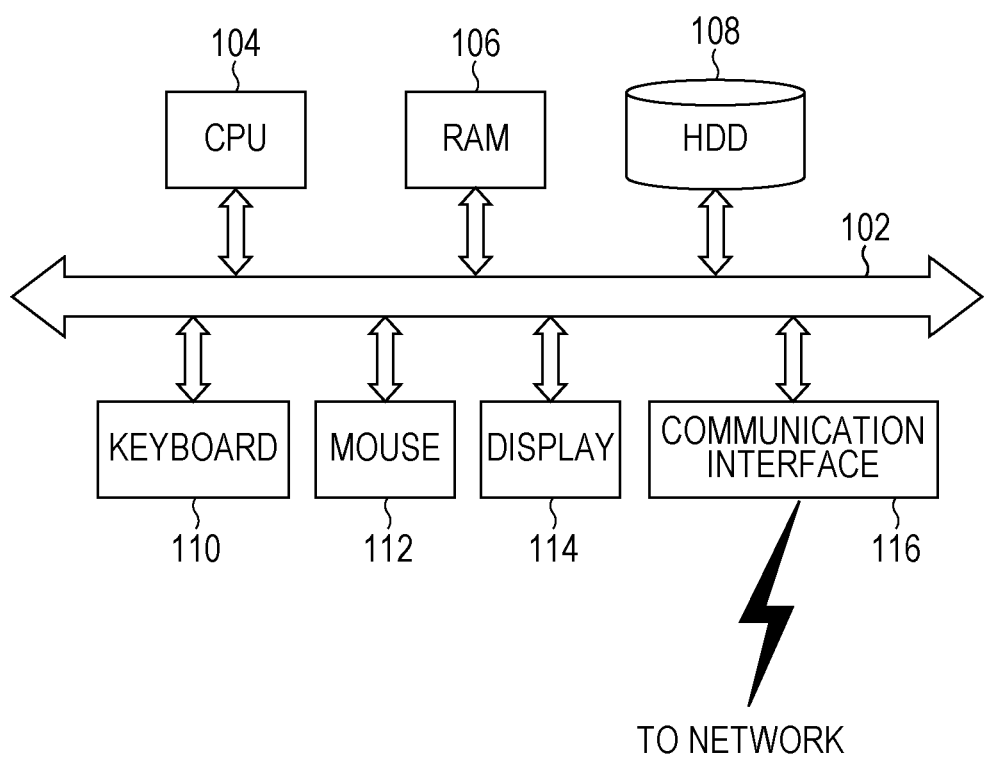
FIG. 1 is a block diagram of an example of hardware of a computer system for executing the present invention.

Embodiments of the present invention will be described hereinbelow with reference to the drawing. It is to be understood that the embodiments are merely for explaining preferred forms of the present invention and are not intended to limit the scope of the present invention. Unless otherwise stated, the same reference signs denote the same part throughout the following diagrams.

FIG. 1 shows a block diagram of computer hardware for implementing a system configuration and processes according to an embodiment of the present invention. In FIG. 1, a CPU 104, a main memory (RAM) 106, a hard disk drive (HDD) 108, a keyboard 110, a mouse 112, and a display 114 are connected to a system bus 102. The CPU 104 is preferably based on a 32-bit or 64-bit architecture; for example, Intel Pentium™ 4, Intel Core™ 2 DUO, and AMD Athlon™ can be used. The main memory 106 preferably has a capacity of 2 GB or more, more preferably, a capacity of 4 GB or more.

The hard disk drive 108 stores an operating system. The operating system may be any operating system conforming to the CPU 104, such as Linux™, Microsoft Windows™ 7, Windows XP™, Windows™ 2003 server, and Apple Computer Mac OS™.

Preferably, the hard disk drive 108 further stores a program for operating the system as a Web server, such as Apache, which is loaded in the main memory 106 when the system is started.

The hard disk drive 108 further stores a Java® run-time environment program for implementing a Java® virtual machine (JVM) 218, which is loaded in the main memory 106 when the system is started.

The hard disk drive 108 further stores an X10 source code 202, a parsing routine 204 for the X10 source code 202, a Java® code generating routine 208, a Java® compiler 212, and a Java® X10 run-time library 214 used by the Java® compiler 212, which will be described later with reference to FIG. 2. These routines are preferably written in Java®, are stored as a Java® bytecode 216, and are operated on the JVM 218.

The keyboard 110 and the mouse 112 are used to operate graphic objects, such as an icon, a task bar, and a textbox, displayed on the display 114 in accordance with a graphical user interface provided by the operating system.

The display 114 is preferably a 32-bit true color LCD monitor having a 1024- by 768-pixel resolution or more, although not limited thereto. The LCD monitor (not shown) is used to select an X10 source code file to be complied (not shown) or to display a menu for executing a compiling operation with the keyboard 110 or the mouse 112.

The communication interface 116 is connected to a network, preferably with Ethernet® protocol. The communication interface 116 receives a processing request from a client computer (not shown) by using a function provided by Apache in accordance with a communication protocol, such as TCP/IP, or returns a processing result to the client computer (not shown).

Figure 2:
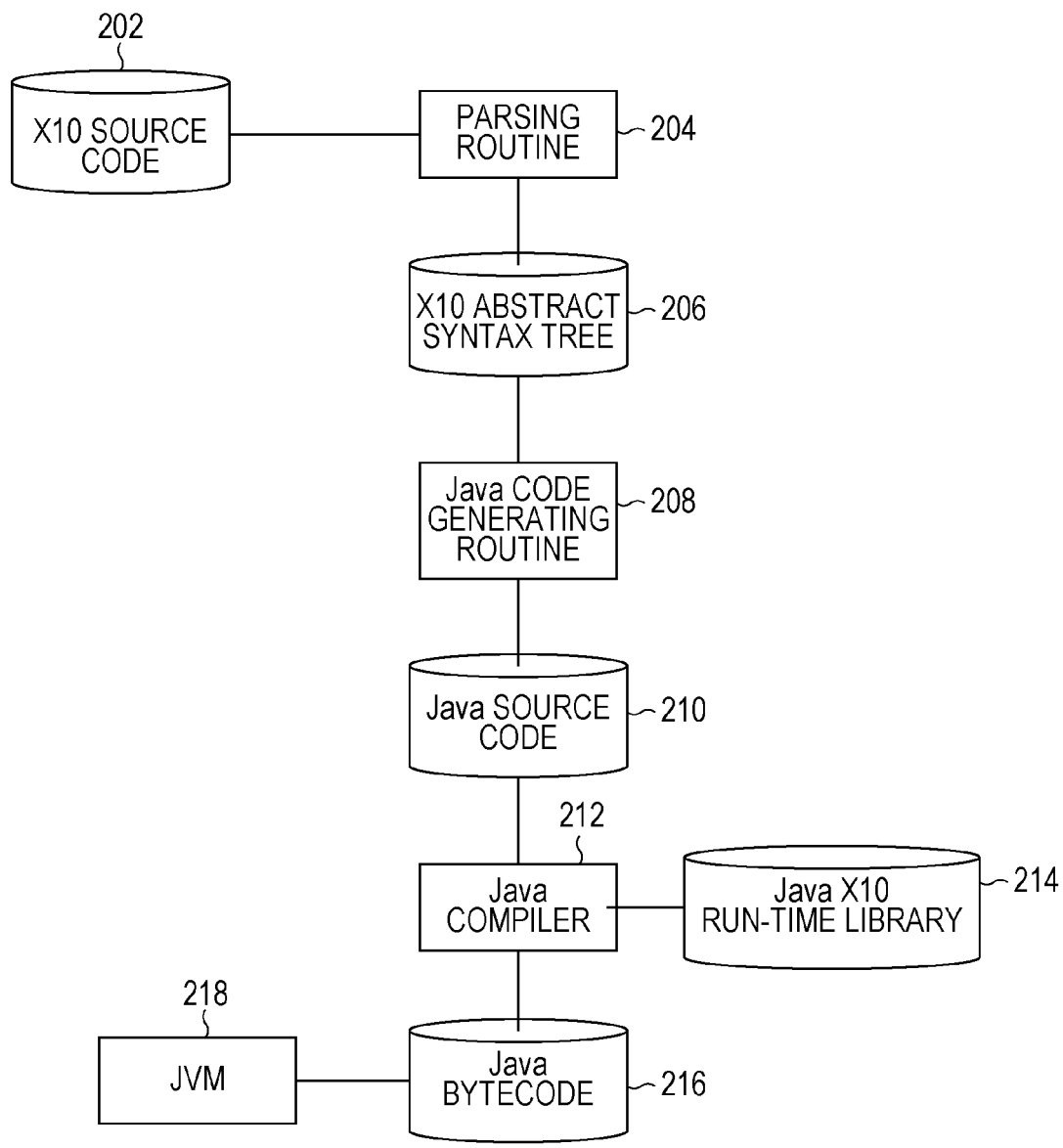
FIG. 2 is a block diagram showing a functional configuration according to an embodiment for executing the present invention.

FIG. 2 is a block diagram showing a functional configuration according to an embodiment for executing the present invention. The parsing routine 204 reads the X10 source code 202 and converts it to an X10 abstract syntax tree 206. Since a technique for generating an abstract syntax tree from a source code is described in, for example, Alfred V. Aho, Ravi Sethi, Jeffrey D. Ullman, "Compilers: Principles, Techniques, and Tools", Addision Wesley Publishing Company, 1986, Andrew W. Appel, "Modern Compiler Implementation", Cambridge University Press, 1998, and is not the intention of the present invention, a description thereof will be omitted here. Here, of the descriptions of the nodes of the abstract syntax tree, notable descriptions are constructor definition and constructor invocation in the X10 source code 202.

The generated X10 abstract syntax tree 206 is preferably stored in the hard disk drive 108. The Java® code generating routine 208 implements the function of the present invention, which reads data of the X10 abstract syntax tree 206 and generates the Java® source code 210. The function of the Java® code generating routine 208 related to the present invention will be described later in detail with reference to the flowchart in FIG. 3.

The Java® source code 210 generated by the Java® code generating routine 208 is preferably stored in the hard disk drive 108. The Java® compiler 212 generates the Java® bytecode 216 with reference to the Java® X10 run-time library 214. The Java® bytecode 216 are preferably loaded in the main memory 106 but may be stored in the hard disk drive 108. The generated Java® bytecode 216 is executed on the JVM 218.

Figure 3:
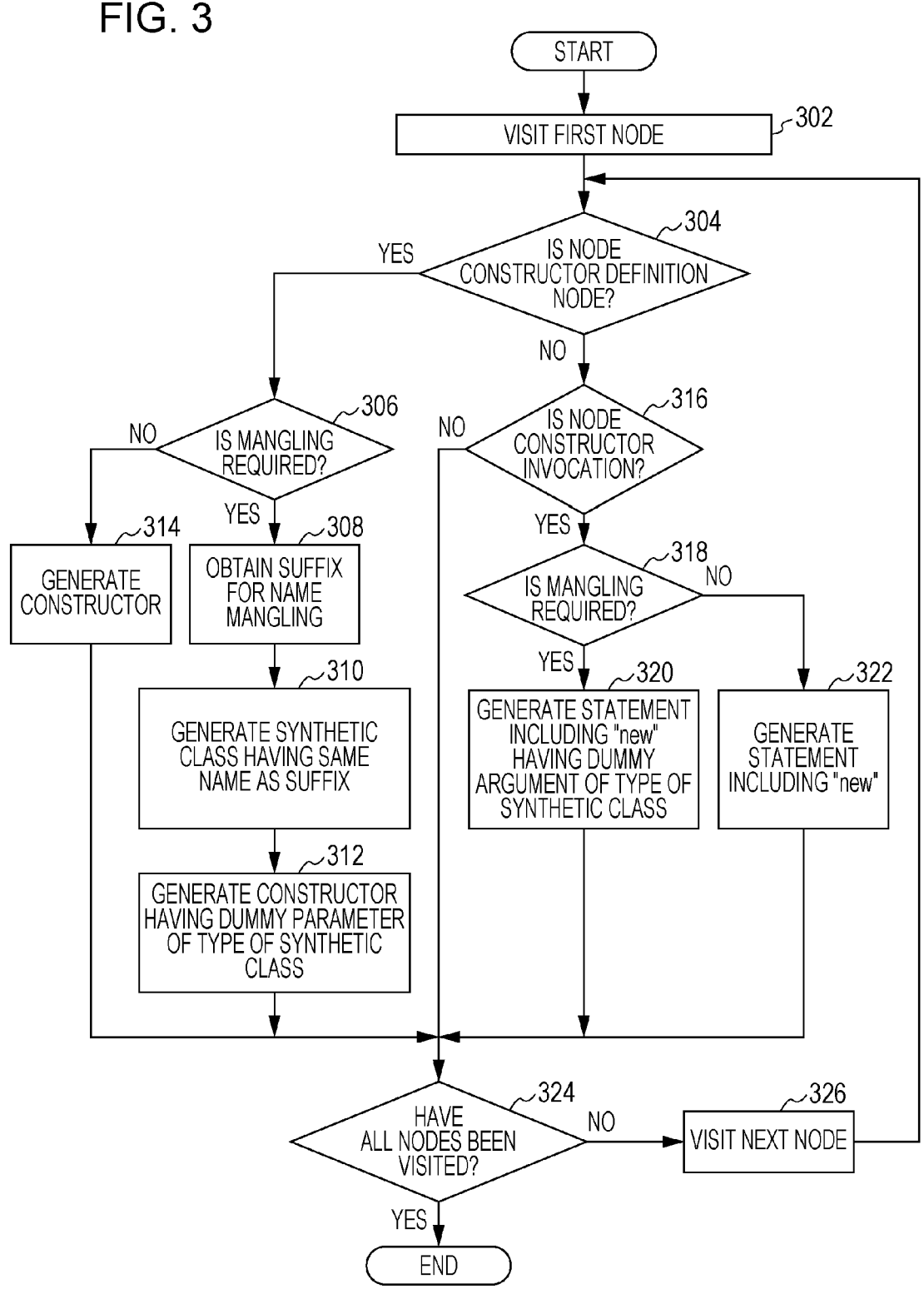
FIG. 3 is a flowchart of the process of the present invention.

Next, the function of the Java® code generating routine 208 related to the present invention will be described with reference to the flowchart in FIG. 3. In FIG. 3, in step 302, the Java® code generating routine 208 visits the first node of the X10 abstract syntax tree.

In step 304, the Java® code generating routine 208 determine whether the visited node is a constructor definition.

Part of an example of the X10 source code 202 will be described as follows:

```
class C[T, U] {
  def this(a:U) { } //ctor id = 0
  def this( ) { } //ctor id = -1
  def this(a:Any) { } //ctor id = -1
  def this(a:T) { } //ctor id = 1
}
```

-continued

```
new C[String,Double](12.3);
new C[String,Double]("abc");
```

Here, the constructor definition node is a node corresponding to "def this . . . ". If the Java® code generating routine 208 determines that the node is a constructor definition, then in step 306, it determines whether mangling is required. "Mangling is required" means that the parameters of the target method have type parameters. If mangling is required, then in step 308, the Java® code generating routine 208 acquires a suffix for name mangling. Here, an example of the suffix is a value, such as "__0C$$U".

In step 310, the Java® code generating routine 208 generates a synthetic class having the same name as the suffix. An example thereof is as follows:
abstract static class __0C$$U { }

In step 312, the Java® code generating routine 208 generates a constructor having a dummy parameter of the type of the synthetic class. An example thereof is the following statement:
C(Type T, Type U, U a, __0C$$U dummy) { }

Returning to step 306, if it is determined that mangling is not required, then in step 314, the Java® code generating routine 208 simply generates a constructor.

Returning to step 304, if it is determined that the node is not a constructor definition, then in step 316, the Java® code generating routine 208 determines whether the node is a constructor invocation. Here, an example of constructor invocation in the X10 source code 202 is the following statement:
new C[String,Double] (12.3);

If it is determined that the node is constructor invocation, then in step 318, the Java® code generating routine 208 determines whether mangling is required. When it is determined that mangling is required, then in step 320, the Java® code generating routine 208 generates a statement including "new" having an appropriate value that matches the type of the synthetic class. Here, an example of the statement including "new" having an appropriate value that matches the type of the synthetic class is the following statement:
new C<String,Double>(Types.STRING, Types.DOUBLE, 12.3, (C.__0C$$U) null);

On the other hand, if it is determined in step 318 that mangling is not required, then in step 322, the Java® code generating routine 208 generates a statement simply including "new".

In step 316, if it is determined that the node is not constructor invocation, step 318 and step 320 or 322 are skipped.

Thus, the process reaches step 324, where the Java® code generating routine 208 determines whether all the nodes have been visited. In the processes leading to step 324, although the Java® code generating routine 208 includes various processes that have no direct relation to the present invention, descriptions thereof will be omitted for convenience.

In step 324, if the Java® code generating routine 208 determines that all the nodes have been visited, the process ends.

In step 324, if it is determined that all the nodes have not yet been visited, then in step 326, the Java® code generating routine 208 visits the next node and returns to step 304.

Next, a specific conversion example of the X10 source code 202 will be shown. The foregoing X10 source code will be shown again.

```
class C[T, U] {
  def this(a:U) { } //ctor id = 0
  def this( ) { } //ctor id = -1
  def this(a:Any) { } //ctor id = -1
  def this(a:T) { } //ctor id = 1
}
new C[String,Double](12.3);
new C[String,Double]("abc");
```

In the related art, this source code is converted to the following Java® code:

```
class C<T, U> {
  C(Type T, Type U, U a, Class dummy) { }
  C(Type T, Type U) { }
  C(Type T, Type U, Object a) { }
  C(Type T, Type U, T a, Class[ ] dummy) { }
}
new C<String,Double>(Types.STRING, Types.DOUBLE, 12.3, (Class) null);
new C<String,Double>(Types.STRING, Types.DOUBLE, "abc", (Class[ ]) null);
```

In this case, since the order of definition the constructor is a relative value and can be changed due to addition/deletion of another constructor, a problem of stable dispatch being impossible has occurred as above.

In contrast, according to an embodiment of the present invention, the code is converted to the following Java® code:

```
class C<T, U> {
  abstract static class __0C$$U { }
  abstract static class __0C$$T { }
  C(Type T, Type U, U a, __0C$$U dummy) { }
  C(Type T, Type U) { }
  C(Type T, Type U, Object a) { }
  C(Type T, Type U, T a, __0C$$T dummy) { }
}
new C<String,Double>(Types.STRING, Types.DOUBLE, 12.3, (C.__0C$$U) null);
new C<String,Double>(Types.STRING, Types.DOUBLE, "abc", (C.__0C$$T) null);
```

This technique allows mangling of individual methods irrespective of the other methods, thus allowing stable mangling.

Although an embodiment of a process for converting an X10 source code to a Java® source code has been described, the present invention is not limited to this specific embodiment; various modifications may be made. For example, an X10 source code may be converted directly to a Java® bytecode without being temporarily converted to a Java® source code.

The source language is not limited to X10 and may be, of statically typed languages, any programming language that supports generics based on reification. Examples that satisfy such a condition include C++ and C#.

The target language is not limited to Java® and may be any programming language that supports generics based on erasure, such as Scala.

[Reference Signs List]
104: CPU
106: main memory
108: hard disk drive
204: parsing routine
208: Java code generating routine

The invention claimed is:

1. A computer implemented method for converting a source code in a first programming language to a code in a second programming language, the method comprising the steps of:
    preparing the source code in the first programming language;
    scanning the source code in the first programming language;
    determining, from the scanning, whether parameters of a target method have type parameters;
    acquiring a suffix if the target method parameters have the type parameters;
    generating a syntax class whose name is identical to the acquired syntax;
    generating a constructor having a dummy parameter of a type of the syntax class;
    adding the dummy parameter of the type of the synthetic class to a definition of the generated constructor;
    adding an appropriate value that matches the type of the dummy parameter to an invocation of the generated constructor; and
    generating a code in the second programming language converted based on a result of adding said dummy parameter and type matching values, wherein the first programming language is a programming language based on reification, and the second programming language is a programming language based on erasure.

2. The method according to claim 1, wherein the first programming language is X10, the second programming language is Java, and the code in the second programming language is a Java bytecode.

3. The method according to claim 1, wherein the first programming language is X10, the second programming language is Java, and the code in the second programming language is a Java source code.

4. The method according to claim 1, wherein the appropriate value that matches the type of the dummy parameter is null.

5. A computer executed program product for converting a source code in a first programming language to a code in a second programming language by computer processing, said program product comprising:
    a tangible storage medium readable by a processing unit and storing instructions for execution by the processing unit for causing the computer to execute the steps of:
    preparing the source code in the first programming language;
    scanning the source code in the first programming language;
    determining, from the scanning, whether parameters of a target method have type parameters; acquiring a suffix if the target method parameters have the type parameters;
    generating a syntax class whose name is identical to the acquired syntax; generating a constructor having a dummy parameter of a type of the syntax class;
    adding the dummy parameter of the type of the synthetic class to a definition of the generated constructor;
    adding an appropriate value that matches the type of the dummy parameter to an invocation of the generated constructor; and
    generating a code in the second programming language converted based on a result of adding said dummy parameter and type matching values;
    wherein the first programming language is a programming language based on reification, and the second programming language is a programming language based on erasure.

6. The program product according to claim 5, wherein the first programming language is X10, the second programming language is Java, and the code in the second programming language is a Java bytecode.

7. The program product according to claim 5, wherein the first programming language is X10, the second programming language is Java, and the code in the second programming language is a Java source code.

8. The program product according to claim 5, wherein the appropriate value that matches the type of the dummy parameter is null.

9. A computer implemented system for converting a source of a first programming language to a code of a second programming language, the system comprising:
    a memory device;
    a processor unit coupled with the memory device for performing a method comprising: preparing the source code in the first programming language;
    scanning the source code in the first programming language and; determining, from the scanning, whether parameters of a target method have type parameters;
    acquiring a suffix if the target method parameters have the type parameters;
    generating a syntax class whose name is identical to the acquired syntax;
    generating a constructor having a dummy parameter of a type of the syntax class;
    adding the dummy parameter of the type of the synthetic class to a definition of the generated constructor;
    adding an appropriate value that matches the type of the dummy parameter to an invocation of the generated constructor; and
    generating a code in the second programming language converted based on a result of adding said dummy parameter and type matching values;
    wherein the first programming language is a programming language based on reification, and the second programming language is a programming language based on erasure.

10. The system according to claim 9, wherein the first programming language is X10, the second programming language is Java, and the code in the second programming language is a Java bytecode.

11. The system according to claim 9, wherein the first programming language is X10, the second programming language is Java, and the code in the second programming language is a Java source code.

12. The system according to claim 9, wherein the appropriate value that matches the type of the dummy parameter is null.

* * * * *